March 24, 1925.
E. E. MILLER
EXPANSIBLE PACKER FOR HYDRAULIC PLUNGERS
Filed Jan. 6, 1925
1,531,242
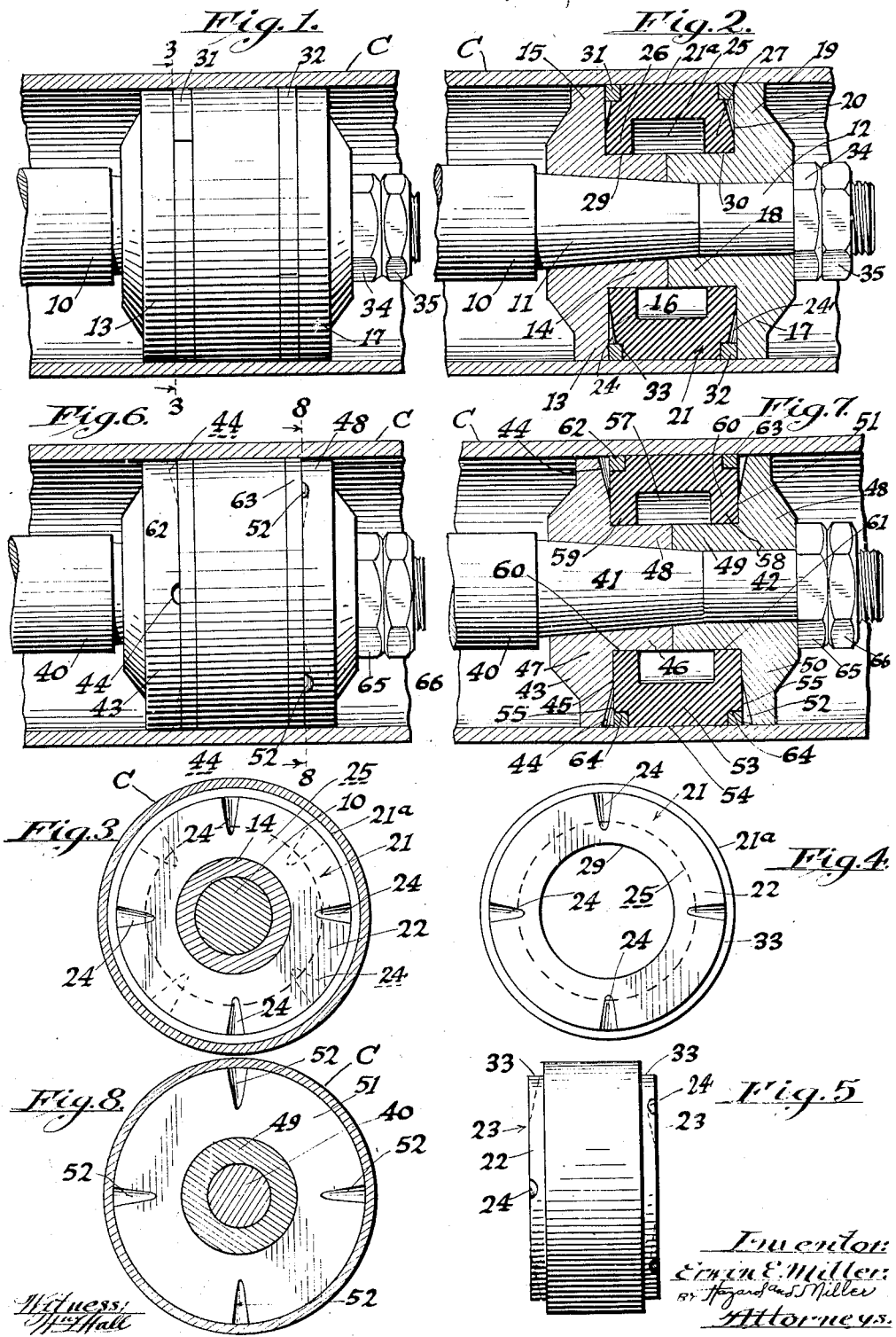

Patented Mar. 24, 1925.

1,531,242

UNITED STATES PATENT OFFICE.

ERWIN E. MILLER, OF FULLERTON, CALIFORNIA.

EXPANSIBLE PACKER FOR HYDRAULIC PLUNGERS.

Application filed January 6, 1925. Serial No. 937.

*To all whom it may concern:*

Be it known that I, ERWIN E. MILLER, a citizen of the United States, residing at Fullerton, in the county of Orange and State of California, have invented new and useful Improvements in Expansible Packers for Hydraulic Plungers, of which the following is a specification.

This invention relates to expansible packers for hydraulic plungers.

An object of this invention is to provide a packer for pump plungers expansible by internal fluid pressure.

Another object of this invention is to provide a packer that is particularly adapted for pumps used in rotary drilling where there is considerable grit in the fluid.

With the foregoing and other objects in view which will be made manifest in the following detailed description and pointed out in the appended claims, reference is had to the accompanying drawings for an illustrative embodiment of the invention, wherein:

Figure 1 is a section through a pump cylinder showing a pump plunger and an expansible packer in elevation;

Fig. 2 is a transverse section, analogous to Fig. 1, through the pump cylinder and plunger with the expansible packer;

Fig. 3 is a section taken on the line 3—3 of Fig. 1;

Fig. 4 is an end elevation of an expansible packer;

Fig. 5 is a side elevation of the expansible packer;

Fig. 6 is a section through the pump cylinder showing a modified form of the pump plunger and packer, which are shown in elevation;

Fig. 7 is a view analogous to Fig. 6 showing the cylinder, plunger and packer in transverse section; and Fig. 8 is a section taken on the line 8—8 of Fig. 7.

Referring to Figs. 1 to 5 inclusive, 10 designates a rod having a tapered portion 11 terminating in a cylindrical portion 12. A head 13 is mounted on the tapered portion of the rod 10 and has a hub 14 depending from an annular portion 15 having a flat face 16. A head 17 is also mounted on the rod 10 and has a hub 18 depending from an annular portion 19 having a flat face 20.

A packer, generally designated at 21, formed of resilient material, such as rubber, has an annular straight face 21ª and flat end faces 22 and 23 having a plurality of tapered depressions 24. An annular recess 25 is formed between flanges 26 and 27 having annular openings 29 and 30 engaging the hubs 14 and 18. Protecting rings 31 and 32 are mounted in annular depressions 33 formed in the edges of the packer. The heads 13 and 17 are brought into engagement by tightening a nut 34 and retained by a lock nut 35, and as the flat ends of the hubs 14 and 18 are abutting, the packer cannot be compressed laterally when the nut 34 is tightened.

Referring to Figs. 6, 7 and 8, 40 designates a rod having a tapered portion 41 terminating in a cylindrical portion 42. A head 43 is mounted on the tapered portion 41 of the rod 40 and has a plurality of tapered depressions 44 formed in a flat face 45 and a hub 46 is integrally formed on an annular portion 47. A head 48 is also mounted on the rod 40 and has a hub 49 depending from an annular portion 50 having a flat face 51, in which is formed a plurality of tapered depressions 52. A packer, generally designated at 53, formed of resilient material, such as rubber, has an annular straight face 54 and flat end faces 55. An annular recess 57 is formed between flanges 58 and 59 having annular openings 60 and 61 respectively engaging the hubs 46 and 49. Protecting rings 62 and 63 are mounted in annular depressions 64 formed in the edges of the packer. The heads 43 and 48 are brought into engagement by tightening a nut 65 and retained by a lock nut 66, and as the flat ends of the hubs 46 and 49 are abutting, the packer cannot be compressed laterally when the nut 65 is tightened.

The operation of the plunger with the expansible packer is as follows: Referring to Figs. 1 to 5 inclusive, the plunger reciprocates in a cylinder C, the straight annular face 21ª engaging the wall of the cylinder and during the first stroke or so of the plunger (assuming the pump is just started). Fluid under pressure in the cylinder will enter and fill the recess by first passing between the protecting rings 31 and 32 and flat end faces 16 and 20 of the heads 13 and 17, thence through the tapered depressions 24 in the faces 22 and 23 and openings 29 and 30 in the flanges of the packer engaging the hubs of the heads. The tapered depressions act as guide channels. Immediately the recess is full, the pressure of the fluid in the cylinder and recess will be equalized. As the pump continues to operate, the annular face 21ª of the packer will wear down, and as the face wears, a corresponding amount of fluid under pressure enters the recess and expands the packer.

The operation of the plunger and packer shown in Figs. 6, 7 and 8 is substantially the same as the plunger and packer shown in Figs. 1 to 5 inclusive except that the tapered depressions 44 in the flat faces 51 and 55 of the heads 43 and 48 act as guide channels for the fluid entering the recess 57.

From the construction it will be seen that the packer is of unitary construction and in connection with the head forms a packer expansible by the fluid pressure in the pump cylinder.

It will be understood that various changes in the detail of construction may be made without departing from the spirit or scope of the invention as defined by the appended claims.

I claim:

1. An expansible packer for pump plungers comprising an annular body of resilient material having an internal annular recess, flat end faces having a plurality of tapered depressions formed therein, and a split metallic ring set in the outer edges of said annular body.

2. A pump plunger comprising a rod, a head having a hub mounted on the rod, a second head mounted on the rod having a hub abutting the hub of the first rod, a flexible expansible packer having flat end faces with a plurality of tapered depressions engaging flat faces on the heads, openings engaging the hubs, and an annular internal recess forming a chamber around the hubs.

3. An expansible packer for pump plungers in the form of an annular body of resilient material having flat end faces, an annular internal recess formed between internal flanges having openings therein, and a split metallic ring set in the outer edges of the flat faces.

4. A pump plunger comprising a rod, a head mounted on the rod and having a plurality of tapered depressions in a flat face, a flexible expansible packer engaging the flat faces of said head, and a second head mounted in the rod and having a plurality of tapered depressions in a flat face engaging said packer.

In testimony whereof I have signed my name to this specification.

ERWIN E. MILLER.